US010015727B2

(12) United States Patent
Poulsen et al.

(10) Patent No.: US 10,015,727 B2
(45) Date of Patent: Jul. 3, 2018

(54) AUTOMATIC DETECTION OF A NETWORK OPERATOR FOR A MOBILE NETWORK DEVICE

(71) Applicant: Spirent Communications, Inc., Sunnyvale, CA (US)

(72) Inventors: Dennis Juul Poulsen, Aarhus C. (DK); Manuel Rafael Ciosici, Brabrand (DK); Sune Sonne Andersen, Aarhus (DK)

(73) Assignee: Mobilethink A/S, Aarhus (DK)

( * ) Notice: Subject to any disclaimer, the term of this patent is extended or adjusted under 35 U.S.C. 154(b) by 20 days.

(21) Appl. No.: 14/903,591

(22) PCT Filed: Jul. 8, 2013

(86) PCT No.: PCT/DK2013/050230
§ 371 (c)(1),
(2) Date: Jan. 7, 2016

(87) PCT Pub. No.: WO2015/003707
PCT Pub. Date: Jan. 15, 2015

(65) Prior Publication Data
US 2016/0174141 A1 Jun. 16, 2016

(51) Int. Cl.
*G06F 11/00* (2006.01)
*H04J 1/16* (2006.01)
(Continued)

(52) U.S. Cl.
CPC ........... *H04W 48/16* (2013.01); *H04W 48/18* (2013.01)

(58) Field of Classification Search
CPC .............................. H04W 48/16; H04W 48/18
(Continued)

(56) References Cited

U.S. PATENT DOCUMENTS

2005/0107083 A1* 5/2005 Rager .................. H04W 48/16
455/435.1
2008/0228901 A1 9/2008 Choi et al.
(Continued)

FOREIGN PATENT DOCUMENTS

| JP | 2001-067378 | | 3/2001 |
| JP | 2002-345046 | A | 11/2002 |
| JP | 2007-306217 | A | 11/2007 |

OTHER PUBLICATIONS

WO 2015/003707—International Search Report dated Apr. 6, 2014, 3 pages.
(Continued)

*Primary Examiner* — Chuong T Ho
(74) *Attorney, Agent, or Firm* — Haynes Beffel & Wolfelf LLP; Ernest J. Beffel

(57) ABSTRACT

The invention relates to a method for automatically configuring a mobile device such as a mobile phone with service parameters provided by a network operator. In order to receive the service parameters the mobile phone needs to connect with the network operator associated with the SIM card which the mobile device has been configured with. However, it may be difficult to make this connection since the SIM card does not uniquely define the network operator. According to an embodiment of the invention the network operator is identified or suggested based on databases containing information of names or alternative names of network operators and probabilities indicating a likeliness that a network operator may be the operator associated with the SIM card.

19 Claims, 2 Drawing Sheets

(51) Int. Cl.
*H04L 1/00* (2006.01)
*H04L 12/26* (2006.01)
*H04W 48/16* (2009.01)
*H04W 48/18* (2009.01)

(58) Field of Classification Search
USPC .............. 370/328, 329, 330, 252, 253, 254
See application file for complete search history.

(56) References Cited

U.S. PATENT DOCUMENTS

| | | | | |
|---|---|---|---|---|
| 2009/0219833 | A1* | 9/2009 | Yaqub | H04W 48/16 370/254 |
| 2011/0077003 | A1* | 3/2011 | Shin | H04W 48/16 455/434 |
| 2011/0195700 | A1 | 8/2011 | Kukuchka et al. | |
| 2011/0238532 | A1* | 9/2011 | Zargahi | G06Q 30/04 705/27.1 |
| 2012/0122441 | A1* | 5/2012 | Kim | H04W 28/18 455/418 |
| 2013/0318518 | A1* | 11/2013 | Paalanen | H04L 41/082 717/171 |
| 2014/0349634 | A1* | 11/2014 | Kukuchka | H04W 8/18 455/418 |

OTHER PUBLICATIONS

WO 2015/003707—International Preliminary Report on Patentablity dated Nov. 9, 2015, 15 pages.
WO 2015/003707—International Search Report and Written Opinion dated Jun. 4, 2014, 8 pages.
PCT/DK2013/050230—Response to First Written Opinion dated Jun. 4, 2014 filed May 8, 2015, 9 pages.
CN 201380078964.1—Voluntary Amendments filed Oct. 24, 2017, 10 pages.
TW 103123438—Request for Examination filed Jul. 6, 2017, 10 pages.
EP 13741965.1—Voluntary Amendments filed Sep. 5, 2016, 8 pages.
AU 2013394153—First Office Action dated Jul. 19, 2017, 5 pages.
EP 13741965.1—First Office Action dated Sep. 22, 2017, 7 pages.
JP 2016-524686—Decision to Grant dated Aug. 1, 2017, 3 pages.

* cited by examiner

AUTOMATIC DETECTION OF A NETWORK OPERATOR FOR A MOBILE NETWORK DEVICE

FIELD OF THE INVENTION

The invention relates to mobile network devices, particularly to methods for configuring a mobile network device for operation with a given network operator.

BACKGROUND OF THE INVENTION

When purchasing a new mobile network device, e.g. a mobile phone, the customer receives a device pre-provisioned with GSM telecommunications parameters such as Internet, MMS, streaming, tethering, etc.

By just containing a valid SIM card a GSM mobile telecommunications terminal is given access to the telephony service and the short message service (SMS). However, accessing advanced services such as Internet and multimedia messaging (MMS) require extra settings in the device. These settings, i.e. service parameters, need to be obtained from the network operator associated with the SIM card. For example, when the user changes subscription to a new network operator and, therefore, inserts a new SIM card, the original or previous settings for e.g. Internet services are no longer valid. However, there is no standard procedure for automatically configuring the mobile device with new valid service parameters.

Accordingly, it is a problem to automatically configuring a mobile device with service parameters.

US2008228901 discloses a network parameter automatic configuration apparatus and a method of a portable terminal. The network parameter automatic configuration apparatus includes a memory, a configuration database, a smart card, a configuration searcher and a configuration processor. According to the present invention, without any addition user actions for network parameter configuration, the network parameters can be automatically configured and user convenience can be enhanced thereby.

The inventor of the present invention has appreciated that an improved solution for automatically configuring a mobile device is of benefit, and has in consequence devised the present invention.

SUMMARY OF THE INVENTION

In general, the invention preferably seeks to mitigate, alleviate or eliminate one or more of the above mentioned disadvantages relating to problems with configuring a mobile device. In particular, it may be seen as an object of the present invention to provide a method that solves the above mentioned problems, or other problems, of the prior art.

To better address one or more of these concerns, in a first aspect of the invention a method for automatically determining a network operator for a mobile network device configured to operate on a network operated by the network operator is presented, wherein the mobile device is configurable by a storage card containing one or more network codes and a network operator name, the method comprises:

reading the card network codes and the card operator name, accessing a database stored on the mobile device which database contains different network operators, network codes associated with the network operators, and operator names associated with the network operators, comparing network codes from the storage card with the network codes in the database for determining candidate network operators having the same network codes as the network codes from the storage card, comparing the card operator name with the database operator names associated with the candidate network operators for determining a similarity score for each of the candidate network operators, attempt connecting to the candidate network operators in descending order of the determined similarity scores.

Accordingly, without any input from the user of the mobile device, the mobile device may be able to automatically detect the operator associated with the storage card.

In an embodiment the database further contains subscription types, for at least some of the network operators, wherein a candidate operator is defined by one of the operator names and the subscription type associated with the one operator name.

In an embodiment the database further comprises probabilities associated with the network operators, wherein the probabilities indicate the probability that a mobile device configured with a given network code is operable with one of the network operators, and wherein the method further comprises:

determining probability scores based on the determined similarity scores and the probabilities associated with the network operators, attempt connecting to the candidate network operators in descending order of the determined probability scores.

By combining similarity scores with the probabilities the automatic detection of the operator associated with the storage card may result in an even higher success rate.

In an embodiment the method further comprises:

when an attempted connection is successful, setting the candidate network operator that was successfully connected to as the network operator for the mobile device.

In an embodiment the method is for determining service parameters for the mobile network device, wherein the service parameters are necessary for enabling the mobile device to access services provided by the network operator.

In a related embodiment the database further comprises service parameters for at least a first service offered by at least some of the network operators, wherein the method comprises when an attempted connection is successful, retrieving from the database one or more of the service parameters for the first service, wherein the service parameters for the first service are associated with the network operator that was successfully connected to, test connectivity of the first service by attempting a connection to the network operator for the mobile device by use of the retrieved service parameters, if the test was successful, configuring the mobile device with the service parameters of the first service.

In a related embodiment the database comprises service parameters for at least first and second services offered by each of at least some of the network operators, wherein the method comprises retrieving one or more of the service parameters for the second service, wherein the service parameters for the second service are associated with the same network operator as the service parameters for the first service, and configuring the mobile device with the service parameters of the second service, without testing connectivity of the second service.

In an embodiment the method comprises
sending a request for updating the database on the mobile device, wherein the request is sent via the network to a server containing a copy of the database stored by the mobile device,
comparing the copy of the database with an updated database, and
depending on the result of the comparison, sending an update of the database back to the mobile device.

In an embodiment the method comprises
in response to attempt connecting to the candidate network operators in descending order of the determined similarity scores or probability scores,
sending connectivity information to a server containing a copy of the database stored on the mobile device, wherein the connectivity information contains one or more of: network codes of the candidate operator, an operator name of the candidate operator, service parameters used for testing connectivity of a service, information indicating whether the test of connectivity was successful or not.

A second aspect of the invention relates to a computer program product comprising program code instructions which when executed by a processor of a mobile device enables the processor to carry out the method of the first aspect.

A third aspect relates to an electronic circuit containing an implementation of the method of the first aspect.

A fourth aspect relates to a mobile device comprising an electronic circuit according to the third aspect, or a mobile device which stores a computer program product according to the second aspect.

The mobile device comprises a processor capable of processing the computer program product so as to carry out the method of the first aspect The mobile device may further comprise a memory for storing the database.

A fifth aspect relates to an electromagnetic signal carrying the program code instructions according to the second aspect.

A sixth aspect relates to a computer-readable medium comprising a computer program product according to the second aspect. The computer-readable medium may be a CD, a memory, an electronic circuit or other physical medium capable of storing data. The computer-readable medium may be a non-transitory medium.

In general the various aspects of the invention may be combined and coupled in any way possible within the scope of the invention. These and other aspects, features and/or advantages of the invention will be apparent from and elucidated with reference to the embodiments described hereinafter.

In summary the invention relates to a method for automatically configuring a mobile device such as a mobile phone with service parameters provided by a network operator. In order to receive the service parameters the mobile phone needs to connect with the network operator associated with the SIM card which the mobile device has been configured with. However, it may be difficult to make this connection since the SIM card does not uniquely define the network operator. According to an embodiment of the invention the network operator is identified or suggested based on databases containing information of names or alternative names of network operators and probabilities indicating a likeliness that a network operator may be the operator associated with the SIM card.

BRIEF DESCRIPTION OF THE DRAWINGS

Embodiments of the invention will be described, by way of example only, with reference to the drawings, in which.

DESCRIPTION OF AN EMBODIMENT

Figure 1:
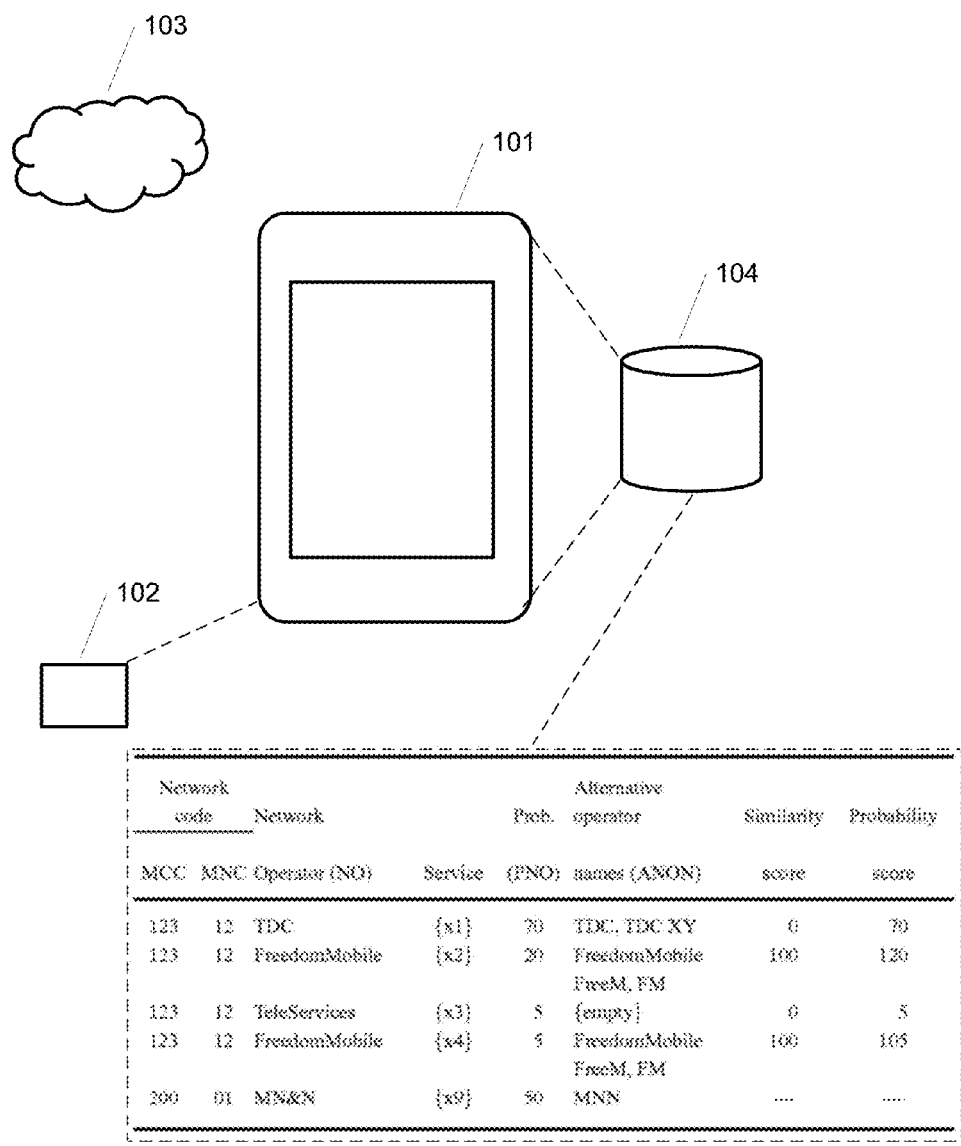
FIG. 1 illustrates a known method for determining a network operator for a mobile network device 101.

FIG. 1 illustrates a known method for determining a network operator for a mobile network device 101 configured to operate on a network 103 operated by the network operator. The mobile device 101 is configurable by a storage card 102, e.g. a subscriber identity module card (SIM card). The storage card 102 contains one or more network codes, e.g. a mobile country code (MCC) and a mobile network code (MNC).

In order to connect to particular network services provided by a given network operator the mobile device reads network codes (e.g. MCC and MNC codes) from the storage card 102 and searches for network operators identified by the read network codes on a setting database 104. A network code may include a combination of a three digit mobile country code (known as the MCC code) and a two to three digit mobile network code (known as the MNC code). The setting database contains service parameters for different network operators. Accordingly, by finding the network operator in the setting database 104 having network codes which are equal to the network codes on the storage card 102, it should be possible to retrieve service parameters for the particular network service and configured the mobile device with the retrieved service parameters. The setting database 104 may be stored on the mobile device 101.

However, the network codes from a given storage card 102 may not uniquely identify the network operator that the mobile device 101 should connect to in order to retrieve service parameters.

Herein network services may include different services other than normal telephony services and short message services (SMS) which normally are accessible by just inserting the storage card in the mobile device. Examples of such network services are: Internet services, i.e. services which enable the mobile phone to access the Internet by configuring the mobile phone with service parameters for Internet services, MMS services, streaming services, tethering services and other know or future services.

There exists at least two types of network operators: One type includes operators which own the network (known as Mobile Network Operators—an MNO), and another type includes operators which don't own the network they use, but rent it from another operator (known as Mobile Virtual Network Operators—an MVNO).

An MVNO is not obliged to register a network code in the country they operate in, but can use their MNO's network code. Current network operator identification methods rely on the combination of the mobile country code (MCC) and the mobile network code (MNC) to determine which network operator the mobile device 101 runs on. Furthermore, there is no commonly agreed standard for network operators to brand their SIM cards (a currently used storage card 102) using a service provider name field (known as the SPN code) that is present on all SIM cards. Currently, network operators have different approaches to the names they insert on SPN field in the SIM card. For example, a network operator, i.e. a GSM telecommunications provider, named FreedomMobile operating in Denmark might choose to fill the SPN field on the SIM card with values such as: Freedom, Freedom DK, FreeMobi, FM or simply leave it empty.

With MVNOs using the MNC of their MNOs and the inconsistency in operator names in the SPN field on SIM cards, mobile devices 101 cannot distinguish between network operators and, therefore, may not be able to choose the correct service parameters for accessing e.g. Internet or MMS services provided by the network operator.

Table 1 below illustrates a setting database 104 wherein different network operators (NO) are listed together with their associated network codes (herein network codes are constituted by MCC and MNC codes), subscription types and service parameters. The different operators TDC, FreedomMobile and TeleServices share the same network codes but have different service parameters x1-x4. The service parameters x2 and x4 are also different for the two subscription types (prepay and postpay) for the operator FreedomMobile. Accordingly, supposing that a user of mobile device 101 subscribes to TDC, then the mobile device is not capable of determining which of the service parameters x1-x4 that should be chosen, i.e. service parameters x3 may be chosen instead of the correct service parameters x4. Also since the SPN field in a SIM card may uniquely identify the network operator, e.g. the SIM card may define FM for the operator name FreedomMobile, the SPN field is also not directly usable for determining the correct network operator.

TABLE 1

| MCC | MNC | Network Operator (NO) | Subscription | Service parameters |
|---|---|---|---|---|
| 123 | 12 | TDC | All | {x1} |
| 123 | 12 | FreedomMobile | Prepay | {x2} |
| 123 | 12 | TeleServices | All | {x3} |
| 123 | 12 | FreedomMobile | Postpay | {x4} |
| 200 | 01 | MN&N | All | {x9} |

Definitions:

Network operator—organisation providing telecommunication services to its subscribers via GSM technology or other network technology. A Network Operator doesn't necessarily need to own the telecommunications network they deliver their services through. It is well known that Network operators may also be referred to as carriers; mobile operators or simply network.

Mobile network device—a device that can connect to a telecommunications network, typically GSM, in order to access telecommunication services such as, e.g. voice calls, Internet, MMS, etc. Embodiments of such mobile network devices are cell phones, tablets with GSM support, truck monitoring devices, etc.

Network services—telecommunication services delivered to mobile devices through a mobile network. An example of such services includes short message service (SMS), voice calling, location positioning (geo location), Voice Mail, Internet, MMS and others.

Service parameters—a collection of elements specifying how a mobile device can access a specific type of telecommunication services offered by a network operator via a telecommunication network (typically a GSM network)

Figure 2:
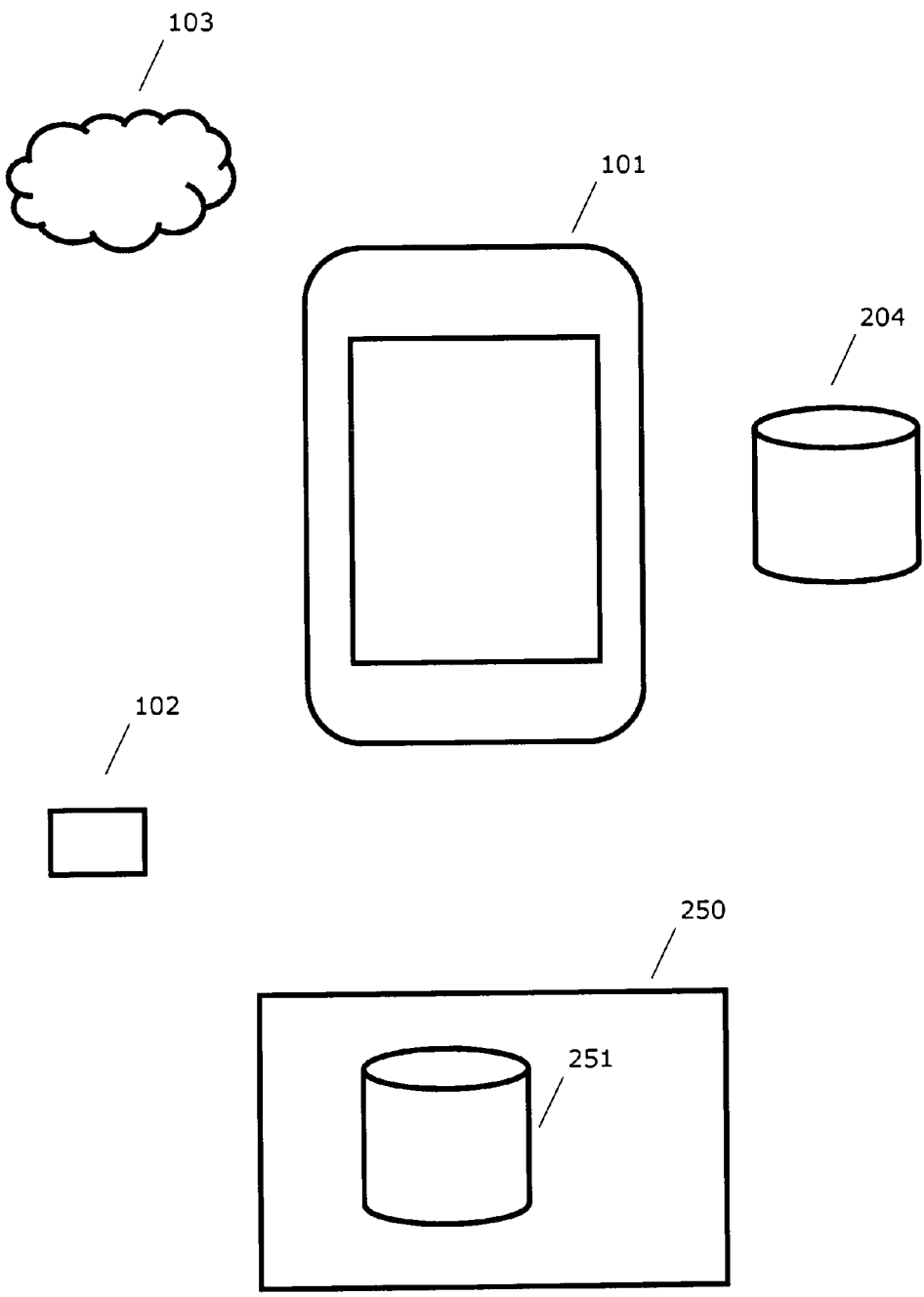
FIG. 2 illustrates a method of an embodiment of the invention for automatically determining a network operator for a mobile network device 101.

FIG. 2 illustrates an embodiment of the invention for automatically determining a network operator for a mobile network device 101 configured to operate on a network 103 operated by the network operator, wherein the mobile device is configurable by a storage card 102 containing a network code and/or a network operator name (SPN—service provider name). According to this embodiment a database 204 is used.

The method for automatically determining a network operator may be available as a connectivity manager process implemented as a computer program product being executable by a processor of the mobile device 101, or available as a hardware implementation in the mobile device 101, e.g. in the form of an electronic circuit containing an implementation of the connectivity manager. Alternatively, part of the connectivity manager may be implemented as a computer program and another part of the connectivity manager may be implemented as a hardware implementation.

An embodiment of a method for automatically determining a network operator includes the steps:

reading the network codes and the operator name from the network card 102 inserted in the mobile device 101, and accessing the database 204 stored on the mobile device.

The database 204 is provided with additional information in comparison with the known database 104. The database 204 contains different network operators (NO), network codes associated with the network operators similarly to table 1.

Additionally, the database 204 may be provided with alternative network operator names (ANON) associated with the network operators (NO).

Alternatively or additionally, the database 204 may be provided with probabilities associated with the network operators PNO (sharing the same network codes), wherein the probabilities indicate the probability that a mobile device configured with a given network code or codes (via the storage card) is operable with one of the network operators.

The database 204 may be configured as a single database containing both the alternative network operator names (ANON) and the probabilities associated with the network operators (PNO). Alternatively, the database 204 may be configured as one or more databases, e.g. one database containing the alternative network operator names (ANON) together with network codes and network operators, and another database containing the probabilities associated with the network operators (PNO).

The database 204 or other database may also contain service parameters for a first service and/or for a second service offered by each of at least some of the network operators.

Table 2 illustrates an example of a database 204 containing different network operators (NO), associated network codes (MCC, MNC codes as an example of network codes), subscription types and service parameters, probability values (PNO) and alternative operator names (ANON). The alternative operator names (ANON) are also referred to as database operator names associated with the network operators NO. The probability values may be given as percentages so that the probability values for all network operators sharing the same network codes add up to 100%, or the probability values may be given as point values or other usable unit. A procedure for creating and updating the database 204 is given elsewhere in the description.

TABLE 2

| Network code | | Network | | | Probability | Alternative operator |
|---|---|---|---|---|---|---|
| MCC | MNC | Operator (NO) | Subsc. | Service. | (PNO) | names (ANON) |
| 123 | 12 | TDC | All | {x1} | 70 | TDC, TDC XY |
| 123 | 12 | FreedomMobile | Prepay | {x2} | 20 | {empty} |
| 123 | 12 | TeleServices | All | {x3} | 5 | FreedomMobile FreeM, FM |
| 123 | 12 | FreedomMobile | Postpay | {x4} | 5 | FreedomMobile FreeM, FM |
| 200 | 01 | MN&N | All | {x9} | 50 | MNN |

An embodiment of the method for automatically determining a network operator include the step:

Comparing network codes retrieved from the storage card 102 in the mobile device 101 with the network codes in the database for determining candidate network operators having the same network codes as the network codes from the storage card. In table 2 the first four network operators are determined as candidate network operators since they share the same network codes.

After candidate network operators have been determined, an embodiment of the method for automatically determining a network operator may further include the steps:

Comparing the card operator name with the database operator names associated with the candidate network operators—i.e. the alternative operator names (ANON). This comparison is performed in order to determine a similarity score for each of the candidate network operators, i.e. a similarity indicating how much the card operator name (e.g. the SPN field name) resembles the alternative operator names (ANON). The comparison may be performed by known fuzzy comparison functions for comparing letter-strings. Such fuzzy functions are available as standard functions or algorithms in various programming languages. For example, Fuzzy comparison algorithms such as, for e.g. the Levenstein distance are implemented in a wide variety of programming languages.

Optionally, the candidate network operators may be ranked after the fuzzy comparison based on the determined similarity scores, When the fuzzy comparison is completed, the connectivity manager may attempt connecting to the candidate network operators in descending order of the determined similarities.

Alternatively or additionally, after candidate network operators have been determined, an embodiment of the method for automatically determining a network operator may further include the steps:

Optionally, ranking the determined candidate network operators based on the probabilities associated with the network operators, Attempt connecting to the candidate network operators in descending order of the probabilities associated with the network operators (PNO).

Thus, after candidate network operators have been determined, the connectivity manager may attempt connecting to the candidate network operators on basis of the similarity scores from the fuzzy comparison or on basis of the probabilities associated with the network operators (PNO).

In an alternative embodiment, after candidate network operators have been determined, the connectivity manager may attempt connecting to the candidate network operators on basis both of the similarity scores and the probabilities associated with the network operators (PNO). According, to this embodiment, the method may include the steps after candidate network operators have been determined:

determining probability scores based on the determined similarity scores and the probabilities associated with the network operators, and attempt connecting to the candidate network operators in descending order of the determined probability scores.

Alternatively or additionally, the method may include the steps:

ranking the determined candidate network operators based on the determined similarity scores and the probabilities associated with the network operators, i.e. based on the probability scores, and attempt connecting to the candidate network operators in descending order of the highest ranked candidate network operators.

When an attempted connection is successful, the connectivity manager sets the candidate network operator that was successfully connected to as the network operator for the mobile device.

Table 3 illustrates an example wherein the card operator name "FM" from the SPN field in a network card 102 in a mobile device 101 is compared with the database operator names associated with the candidate network operators—i.e. the alternative operator names (ANON) of candidate network operators. For convenience the subscriber column has been omitted. For the network operators TDC and Teleservices the similarity score is 0 because there is no match between "FM" and the alternative operator names. For the network operators FreedomMobile (both subscription types) the similarity score is 100 because there is a complete match between "FM" and the alternative operator names. Similarity scores between 0 and 100 are also possible in cases where there is a partial match.

As described above an attempt for connecting to the candidate network operators in descending order of the determined similarities may be performed on basis of the similarity scores alone. However, as seen in Table 3 this may in some situations cause some uncertainty about which Network operator is the correct one since, in this example, two operators achieved the maximal similarity score.

Therefore, in order to avoid this uncertainty, probability scores—as shown in Table 3—may be determined from the determined similarity scores and the probabilities associated with the network operators (PNO). The probability scores may be determined by simply adding the similarity scores with the probability percentages (PNO) for each of the network operators (NO), or by combining similarity scores with the probability percentages in other ways. After the probability scores have been determined, the connectivity manager may perform the step of connecting to the candidate network operators in descending order of the determined probability scores.

TABLE 3

| Network code | | Network | | Prob. | Alternative operator | Similarity | Probability |
|---|---|---|---|---|---|---|---|
| MCC | MNC | Operator (NO) | Service | (PNO) | names (ANON) | score | score |
| 123 | 12 | TDC | {x1} | 70 | TDC, TDC XY | 0 | 70 |
| 123 | 12 | FreedomMobile | {x2} | 20 | FreedomMobile FreeM, FM | 100 | 120 |
| 123 | 12 | TeleServices | {x3} | 5 | {empty} | 0 | 5 |
| 123 | 12 | FreedomMobile | {x4} | 5 | FreedomMobile FreeM, FM | 100 | 105 |
| 200 | 01 | MN&N | {x9} | 50 | MNN | — | — |

As described above a purpose of the connectivity manager is to automatically determine a network operator for a mobile network device. A further purpose of the connectivity manager may be to determine service parameters for the mobile network device, wherein the service parameters are necessary for enabling the mobile device to access services provided by the network operator.

Such services may include Internet, MMS, streaming, tethering and other services.

The database stored on the mobile device may also contain service parameters, such as service parameters x1-x4 and x9 for a given service, e.g. an Internet service.

The settings for typical services such as Internet and MMS typically include one or more of the following parameters: setting name, access point name (APN), proxy server address, proxy server port, username, password, MMS center (MMSC), MMS proxy server address, MMS proxy server port, authentication type, setting type (defining which service the setting corresponds to), roaming protocol and a bearer. Some service settings may have more parameters than listed here or fewer if they don't hold a value for a certain parameter. For example, most Internet settings in the world don't have a username or password. Other future services may require other service parameters.

After an attempted connection has been shown to be successful, and possibly after the candidate network operator that was successfully connected to has been set as the network operator for the mobile device, service parameters associated with the network operator that was successfully connected to may be retrieved from the database.

For example, one or more of the service parameters for a first service, e.g. an Internet service, may be retrieved from the database.

After the service parameters have been retrieved, the connectivity of the first service may be tested by attempting a connection to the network operator for the mobile device by use of the retrieved service parameters. If the connectivity test shows to be successful, the mobile device may be configured with the service parameters of the first service. The configuring may be performed by storing the parameters in a memory of the mobile device and possibly updating a user interface with the retrieved parameters.

Connectivity may not be testable for some network services. For example, it may only be possible for MMS settings (Multimedia Messaging Services) to be tested by sending a MMS message. Since it may be undesirable, because of financial cost to the user of the mobile device, that the connectivity manager performs such tests it may be possible to select the proper MMS settings based on another service.

For example, the database 204 may be configured so that there is a link between parameters for different services for a given network operator. In this case service parameters, e.g. parameters for a first service, which have already been successfully tested, may be used for retrieving service parameters for another service, e.g. a second service.

Accordingly, as shown in Table 4 the database 204 may be configured to contain service parameters x1-x4, x9, y1-y4, y9 for at least first and second services offered by each of at least some of the network operators. Service parameters x1 for the first service offered by the network operator TDC are connected, mapped or linked with the service parameters x2 of the second service offered by the same network operator TDC.

In an embodiment, the connectivity manager may be configured to determine service parameters for the mobile network device 101 by retrieving one or more of the service parameters (e.g. y2) for a second service (e.g. MMS), after service parameters (e.g. x2) for a first service (e.g. Internet) have been retrieved, wherein service parameters for the second service are associated with the same network operator as the service parameters for the first service, and wherein the mobile device 204 is configured with the service parameters (e.g. y2) of the second service without testing connectivity of the second service. Since, the database contains service parameters for different services for a given network operator (NO) a mobile device may be configured with service parameters for a given service without testing if the service parameters actually are capable of giving the mobile device to the service in question, while maintaining a high likeliness that the service parameters are the correct ones.

TABLE 4

| Network code | | Network | | First service | Second service | Alternative operator |
|---|---|---|---|---|---|---|
| MCC | MNC | Operator (NO) | Subsc. | par. | par. | names (ANON) |
| 123 | 12 | TDC | All | {x1} | {y1} | TDC, TDC XY |
| 123 | 12 | FreedomMobile | Prepay | {x2} | {y2} | {empty} |
| 123 | 12 | TeleServices | All | {x3} | {y3} | FreedomMobile FreeM, FM |

TABLE 4-continued

| Network code | | Network | | First | Second | Alternative |
| MCC | MNC | Operator (NO) | Subsc. | service par. | service par. | operator names (ANON) |
| --- | --- | --- | --- | --- | --- | --- |
| 123 | 12 | FreedomMobile | Postpay | {x4} | {y4} | FreedomMobile FreeM, FM |
| 200 | 01 | MN&N | All | {x9} | {y9} | MNN |

The probabilities associated with the network operators (PNO) indicating the probability that a mobile device configured with a given network code is operable with one of the network operators or is operable with one of the network operators with a given subscription type may be obtainable by a method for determining network operator probabilities.

The method for determining network operator probabilities may include one or more of the following steps.

Step A: For a given network code (e.g. the code characterised by MCC=123 and MNC=12) counting the number of times a mobile device has been configured with a given network operator, i.e. the number of times that a candidate network operator that was successfully connected to is set as the network operator for the mobile device. The counts for the different network operators CNO (sharing the same network code) may be used calculating a first estimate of the probabilities associated with the network operators (PNO) according to: CNO for a given network operator divided by the sum of CNO counts for the network operators with the same network code.

Step B: For a given network code, estimating the relative size of at least one of the network operators, i.e. estimating how many subscribers a network operator has relative to the other network operators. For example, a network operator which owns a network (an MNO) may be considered larger in terms of subscribers than network operators with the same network code that do not own the network (MVNOs). Normally, only one MNO is associated with a given network code. The counts from step A may be modified according to the estimated sizes, e.g. so that the CNO value from step A is increased with a given value corresponding to the estimated sizes of the network operators. For example, the CNO count for the MNO network operator may be increased, whereas the CNO counts for the other MVNO operators are left unchanged. The probabilities may be determined for the modified counts according to the procedure under step A.

Connectivity information may be sent from a mobile device 101 to a server 250 each time a mobile device has been configured with a given network operator, i.e. each time a candidate network operator that was successfully connected to has been set as the network operator of a given mobile device 101. The connectivity information may contain information about network operator, subscription type, service parameters, network operator names contained in the SPN field on the storage card in the mobile device 102, and possibly other connectivity related information.

Accordingly, the server 250 may be configured to perform the method for determining network operator probabilities, e.g. according to steps A and B in said method, on basis of connectivity information from mobile devices 101.

A method of an embodiment of the invention is for enabling a server 250 to determine content in a database 204, wherein the content comprises 1) probabilities associated with the network operators (PNO) indicating the probability that a mobile device configured with a given network code is operable with one of the network operators or is operable with one of the network operators and/or 2) operator names associated with the network operators, i.e. alternative network operator names (ANON). The method for the server 205 for determining content in the database comprises one or more of the following steps:

receiving connectivity information from a mobile device 101, wherein the connectivity information contains one or more of: network codes of the candidate operator successfully connected to, the operator name of the candidate operator successfully connected to, service parameters used for testing connectivity of a service, service parameters which the mobile device has been configured with, information indicating whether one or more tests of connectivity to one or more network operators was successful or not, information indicating whether one or more tests of connectivity to one or more services of a network operator was successful or not, and network operator name or names contained in the storage card 102 in the mobile device 101, determining network operator probabilities (PNO) indicating the probability that a mobile device configured with a given network code is operable with one of the network operators, wherein the determination comprises increasing a count (CNO) for a network operator that has been successfully connected to by use of the received connectivity information (e.g. by use of a method according to steps A and B above), determining operator names associated with the network operators, i.e. alternative network operator names (ANON), wherein the determination comprises adding the network operator name or names contained in the storage card in the mobile device (contained in the received connectivity information) to the operator names associated with the network operator that has been successfully connected to (in case that the card network operator name is already included in the operator names associated with the network operator no change is performed).

The database 204 determined by the server 250 may be stored in a storage accessible by the server 250 as a server database 251 which can be retrieved by mobile devices 101 in order to configure a mobile device with a database 204. When a database 251 is uploaded to a mobile device 101 or when a mobile device 101 retrieves a database 251 from the server 250, the server 250 maintains information about the content of the database 251 currently stored in a given mobile device 101, e.g. by storing the uploaded database under a given version number for a given mobile device ID-number.

In addition to creating databases, the server 250 may also be used for updating the database 251. Accordingly, a method of an embodiment of the invention is for enabling a server 250 to update content in a database 251 on basis of connectivity information sent from a mobile device. The method for enabling a server 205 to update the database may comprise step A and/or step B from the corresponding method for enabling a server 205 to determine content in a database 204.

In order to enable a mobile device to provide information for updating content in a database 251, the connectivity manager in a mobile device may be configured to carry out the steps:

in response to attempt connecting to the candidate network operators in descending order of the determined similarity scores or probability scores, sending connectivity information to a server 250 which contains a copy of the database 204 stored on the mobile device 101, wherein the connectivity information contains one or more of: network codes of the candidate operator, an operator name of the candidate operator (i.e. an operator name from the storage card), service parameters used for testing connectivity of a service, information indicating whether the test of connectivity was successful or not.

Accordingly, the network operator probabilities (PNO) in the database 251 may be updated on basis of the increased counts (count is increased with one if the mobile device is a new subscriber of the candidate network operator successfully connected to) for the different network operators. Similarly, the alternative network operator names (ANON) in the database may be updated on basis of the storage-card operator name of the candidate operator (i.e. the operator name from the storage card) if it is new relative to names already contained in the database for a given network operator.

A database 204 stored in a mobile device 101 may be updated by the connectivity manager by performing the steps:

sending a request for updating the database 204, wherein the request is sent via the network to a server containing a copy of the database stored by the mobile device 101, comparing the copy of the database 204 with an updated database 250, and depending on the result of the comparison, sending an update of the database back to the mobile device. The update may be in the form of a complete database 204 or in the form of differences of entries in the database 240.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for automatically determining a network operator for a mobile network device configured to operate on a network operated by the network operator, wherein the mobile device is configurable by a storage card containing one or more network codes and a network operator name, the method comprising:

reading the card network codes and the card operator name, accessing a database stored on the mobile device which database contains different network operators, network codes associated with the network operators, and operator names associated with the network operators, comparing network codes from the storage card with the network codes in the database for determining candidate network operators having the same network codes as the network codes from the storage card, comparing the card operator name with the database operator names associated with the candidate network operators for determining a similarity score for each of the candidate network operators, where the similarity score indicates how much the card operator name resembles the operator names in the database, attempt connecting to the candidate network operators in descending order of the determined similarity scores.

2. The method of claim 1, wherein the database further contains subscription types, for at least some of the network operators, and wherein a candidate operator is defined by one of the operator names and the subscription type associated with the one operator name.

3. The method of claim 1, wherein the database further comprises probabilities associated with the network operators, wherein the probabilities indicate the probability that a mobile device configured with a given network code is operable with one of the network operators, and the method further comprising:

determining probability scores based on the determined similarity scores and the probabilities associated with the network operators, attempt connecting to the candidate network operators in descending order of the determined probability scores.

4. The method of claim 1, the method further comprising:

when an attempted connection is successful, setting the candidate network operator that was successfully connected to as the network operator for the mobile device.

5. The method of claim 1, wherein the method is for determining service parameters for the mobile network device, wherein the service parameters are necessary for enabling the mobile device to access services provided by the network operator.

6. The method of claim 5, wherein the database further comprises service parameters for at least a first service offered by at least some of the network operators, the method further comprising:

when an attempted connection is successful, retrieving from the database one or more of the service parameters for the first service, wherein the service parameters for the first service are associated with the network operator that was successfully connected to, test connectivity of the first service by attempting a connection to the network operator for the mobile device by use of the retrieved service parameters, if the test was successful, configuring the mobile device with the service parameters of the first service.

7. The method of claim 5, wherein the database comprises service parameters for at least first and second services offered by each of at least some of the network operators, the further method comprising:

retrieving one or more of the service parameters for the second service, wherein the service parameters for the second service are associated with the same network operator as the service parameters for the first service, and configuring the mobile device with the service parameters of the second service, without testing connectivity of the second service.

8. The method of claim 1, the method comprising:
sending a request for updating the database, wherein the request is sent via the network to a server containing a copy of the database stored by the mobile device,
comparing the copy of the database with an updated database, and
depending on the result of the comparison, sending an update of the database back to the mobile device.

9. The method of claim 1, the method further comprising:
in response to attempt connecting to the candidate network operators in descending order of the determined similarity scores or probability scores,
sending connectivity information to a server containing a copy of the database stored on the mobile device, wherein the connectivity information contains one or more of: network codes of the candidate operator, an operator name of the candidate operator, service parameters used for testing connectivity of a service, information indicating whether the test of connectivity was successful or not.

10. A non-transitory tangible computer readable medium impressed with program instructions that, when executed on hardware, cause the hardware to perform a method of automatically determining a network operator for a mobile network device configured to operate on a network operated by the network operator, wherein the mobile device is configurable by a storage card containing one or more network codes and a network operator name, the method comprising:
reading the card network codes and the card operator name,
accessing a database stored on the mobile device which database contains different network operators, network codes associated with the network operators, and operator names associated with the network operators,
comparing network codes from the storage card with the network codes in the database for determining candidate network operators having the same network codes as the network codes from the storage card,
comparing the card operator name with the database operator names associated with the candidate network operators for determining a similarity score for each of the candidate network operators, where the similarity score indicates how much the card operator name resembles the operator names in the database,
attempt connecting to the candidate network operators in descending order of the determined similarity scores.

11. The non-transitory tangible computer readable medium of claim 10, wherein the database further contains subscription types, for at least some of the network operators, and wherein a candidate operator is defined by one of the operator names and the subscription type associated with the one operator name.

12. The non-transitory tangible computer readable medium of claim 10, wherein the database further comprises probabilities associated with the network operators, wherein the probabilities indicate the probability that a mobile device configured with a given network code is operable with one of the network operators, and the method further comprising:

determining probability scores based on the determined similarity scores and the probabilities associated with the network operators,
attempt connecting to the candidate network operators in descending order of the determined probability scores.

13. The non-transitory tangible computer readable medium of claim 10, the method further comprising:
when an attempted connection is successful, setting the candidate network operator that was successfully connected to as the network operator for the mobile device.

14. The non-transitory tangible computer readable medium of claim 10, wherein the method is for determining service parameters for the mobile network device, wherein the service parameters are necessary for enabling the mobile device to access services provided by the network operator.

15. A device including non-transitory memory and hardware, the memory storing program instructions that, when executed on the hardware, cause the hardware to perform a method of automatically determining a network operator for a mobile network device configured to operate on a network operated by the network operator, wherein the mobile device is configurable by a storage card containing one or more network codes and a network operator name, the method comprising:
reading the card network codes and the card operator name,
accessing a database stored on the mobile device which database contains different network operators, network codes associated with the network operators, and operator names associated with the network operators,
comparing network codes from the storage card with the network codes in the database for determining candidate network operators having the same network codes as the network codes from the storage card,
comparing the card operator name with the database operator names associated with the candidate network operators for determining a similarity score for each of the candidate network operators, where the similarity score indicates how much the card operator name resembles the operator names in the database,
attempt connecting to the candidate network operators in descending order of the determined similarity scores.

16. The device of claim 15, wherein the database further contains subscription types, for at least some of the network operators, and wherein a candidate operator is defined by one of the operator names and the subscription type associated with the one operator name.

17. The device of claim 15, wherein the database further comprises probabilities associated with the network operators, wherein the probabilities indicate the probability that a mobile device configured with a given network code is operable with one of the network operators, and the method further comprising:
determining probability scores based on the determined similarity scores and the probabilities associated with the network operators,
attempt connecting to the candidate network operators in descending order of the determined probability scores.

18. The device of claim 15, the method further comprising:
when an attempted connection is successful, setting the candidate network operator that was successfully connected to as the network operator for the mobile device.

19. The device of claim 15, wherein the method is for determining service parameters for the mobile network device, wherein the service parameters are necessary for enabling the mobile device to access services provided by the network operator.

* * * * *